March 2, 1971　　TERUMOTO YAMAGUCHI　　3,566,460
METHOD OF PRODUCING COMMUTATOR FOR ROTARY ARMATURES
Filed Feb. 5, 1969　　　　　　　　　　　　　2 Sheets-Sheet 1
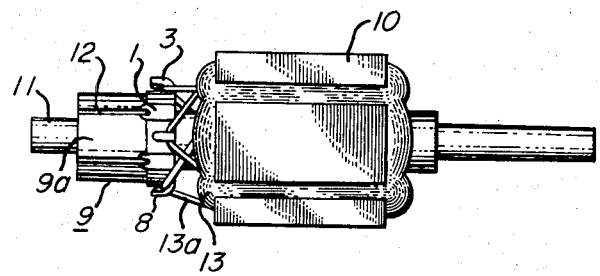
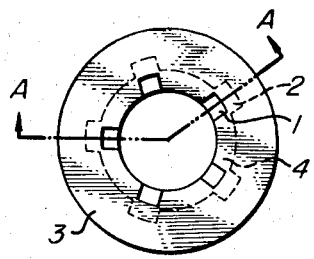
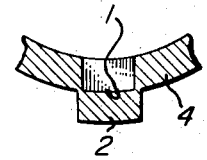
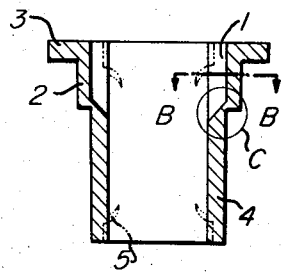
INVENTOR
Terumoto Yamaguchi
BY Cushman, Darby & Cushman
ATTORNEYS March 2, 1971     TERUMOTO YAMAGUCHI     3,566,460
METHOD OF PRODUCING COMMUTATOR FOR ROTARY ARMATURES
Filed Feb. 5, 1969     2 Sheets-Sheet 2

INVENTOR
Terumoto Yamaguchi
BY Cushman, Darby & Cushman
ATTORNEYS

United States Patent Office 3,566,460
Patented Mar. 2, 1971

3,566,460
METHOD OF PRODUCING COMMUTATOR FOR ROTARY ARMATURES
Terumoto Yamaguchi, Anjo-shi, Japan, assignor to Nippon Denso Company Limited, Kariya-shi, Japan
Filed Feb. 5, 1969, Ser. No. 796,811
Claims priority, application Japan, Apr. 19, 1968, 43/26,309
Int. Cl. H01r 43/00
U.S. Cl. 29—597
1 Claim

ABSTRACT OF THE DISCLOSURE

A method of producing a commutator for rotary armatures, which comprises bulging the wall of a flanged end portion of a flanged tube of electrically conductive material radially outwardly to form longitudinally extending recesses at portions where windows are to be formed, forming engaging hooks on the inside wall surface of said tube for each of the tube sections which will provide independent commutator segments, molding the said tube with an insulating material and thereafter punching the flange of the tube in such a manner as to form wire-hooking lugs and to remove the outwardly bulged portions of the tube defining said recesses.

BACKGROUND OF THE INVENTION

Field of the invention

The present invention relates to a method of producing a commutator adapted to be fitted on the shaft of a rotary armature.

Description of the prior art

In the production of conventional commutators adapted for use with rotary armatures, the current-conducting portions thereof have been produced of a steel plate or out of a steel tube, and when it is made of a steel tube for the production of the current-conducting portion, a method has been employed which comprises shaping the steel tube into a desired ring-shape by subjecting it to such a plastic working as expansion, embossing, shaping or punching, molding the shaped steel tube with an insulating material consisting of an asbestos-containing phenolic resin, cutting the outer peripheral surface of the tube so as to eliminate vibration of the finished commutator when fitted on the shaft of a rotary armature and thereafter slitting the tube to divide it into a desired number of individual commutator segments which are electrically insulated from each other. In practicing the method described above, it is usual, in order to facilitate the slitting operation to divide the tube into individual commutator segments, to punch windows in the pressing step of the above-mentioned plastic working, prior to the slitting operation, in the wall of that end of the current-conducting portion which will be located closer to the rotary armature core, at locations where the slits are to be formed.

The formation of such windows is necessary particularly when the product of commutator is to be used with a miniature rotary armature, to facilitate slitting of the tube into individual commutator segments, because in such a case the distance between the core of the rotary armature and the commutator is made small.

However, if the current-conducting portion of the commutator having the windows punched therein is molded with an insulating material, the insulating material flows outwardly through said windows during the process of molding and attaches to the outer peripheral surface as well as the wire-hooking lugs of the commutator, and further the removal of the insulating material from said portions of the commutator is quite difficult. This not only is objectionable from the standpoint of production efficiency but also makes it impossible to always obtain commutators of high quality.

SUMMARY OF THE INVENTION

The object of the present invention is to provide a method of producing a commutator for rotary armatures, which comprises bulging the wall of a flanged end portion of a flanged tube of electrically conductive material radially outwardly to form longitudinally extending recesses at portions where windows are to be formed, forming engaging hooks on the inside wall surface of said tube for each of the tube sections which will provide independent commutator segments, molding the said tube with an insulating material and thereafter punching the flange of the tube in such a manner as to form wire-hooking lugs and to remove the outwardly bulged portions of the tube defining said recesses.

According to the present invention, it is possible to prevent an insulating material from flowing outwardly of a blank tube and attaching to wire-hooking lugs and/or the outer peripheral surface of said tube, and thereby to obtain a clean, high quality commutator.

Further, according to the present invention, there are brought about such excellent advantages that the large amount of man-hours which have heretofore been required for the removal of an insulating material attached to the current-conducting portion of a commutator can be saved entirely and that therefore the productivity can be enhanced drastically.

BRIEF DESCRIPTION OF THE DRAWINGS

FIG. 1 is a front elevation of a rotary armature provided with a commutator produced according to the method of this invention;

FIGS. 2 to 12 inclusive are views for the purpose of illustrating the method of this invention, wherein:

FIG. 2 is a top plan view showing the state of a flanged blank tube after formation of hollow bulges in preparation of forming windows;

FIG. 3 is a vertical sectional view taken along the line A—A of FIG. 2;

FIG. 4 is a fragmentary enlarged view taken along the line B—B of FIG. 3;

FIG. 5 is a fragmentary enlarged view of a portion C of FIG. 3;

FIG. 6 is a top plan view showing the state of the blank tube after insertion of an insulating material therein;

FIG. 7 is a vertical sectional view taken along the line D—D of FIG. 6;

FIG. 8 is a top plan view showing the state of the blank tube after formation of wire-hooking lugs and removal of the hollow bulges by punching;

FIG. 9 is a vertical sectional view of the blank tube shown in FIG. 8;

FIG. 10 is a bottom view of a waste material produced by the punching operation;

FIG. 11 is a vertical sectional view of the waste material shown in FIG. 10; and FIG. 12 is a perspective view of a finished commutator.

DESCRIPTION OF THE PREFERRED EMBODIMENT

Figure 6:
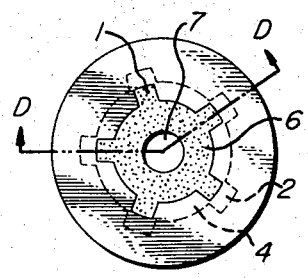
Figure 7:
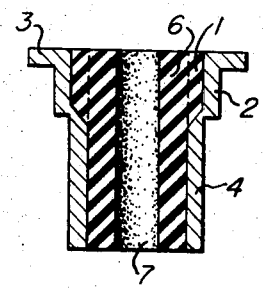

The present invention will be described in further detail hereinafter with reference to the accompanying drawings. First of all, a flanged tube having a flat flange at one end thereof is produced of an electrically conductive material, e.g. steel. Then, the wall of the flanged end portion of the tube is bulged radially outwardly from the inside by extrusion to form hollow bulges 2, defining recesses 1, at portions where slits are to be formed subsequently, as shown in FIGS. 2 and 3. The wall thickness at the connection between the hollow bulge 2 and the body 4 of the tube is made thin to such a degree that said bulge will not be disconnected from the tube body during the process of inserting an insulating material to be described later, as shown in FIG. 5 in an enlarged scale. Then, engaging hooks 5 are formed on the inner peripheral surface of the tube, as indicated by the phantom lines in FIG. 3, in each of the tube sections which will provide independent commutator segments, by scraping up the tube wall in an upward and a downward direction. An insulating material, e.g. asbestos-containing phenolic resin, is charged in the thus obtained blank commutator in a desired shape as shown in FIGS. 6 and 7. In FIGS. 6 and 7, reference numeral 6 designates the insulating material and 7 designates a shaft receiving hole. In this case, the insulating material 6 is filled in each of the recesses 1 but not allowed to flow to the outside of the tube due to the presence of the bulge 2, so that there is no possibility of the insulating material attaching to the upper and lower surface of the flange 3 and the outer peripheral surface of the tube 4. The engaging hooks 5 are completely embedded in the insulating material 6.

Figure 8:
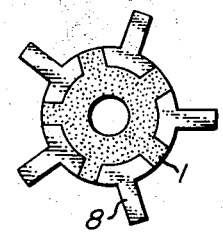
Figure 10:
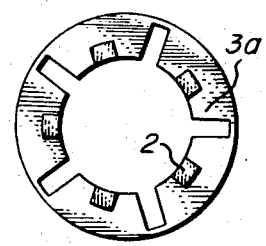
Figure 9:
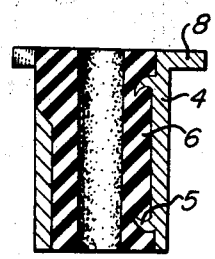
Figure 11:
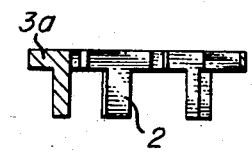

Then, the flange 3 of the tube constituting the conductive portion of the finished commutator is punched so as to form wire-hooking lugs 8 and to remove the hollow bulges 2 as shown in FIGS. 8 and 9. In this case, the bulges 2 and the punched portion 3a of the flange 3 can be removed in the form of a unitary piece as shown in FIGS. 10 and 11 because said budges 2 are connected to the tube body 4 by a thin wall as stated previously.

Figure 12:
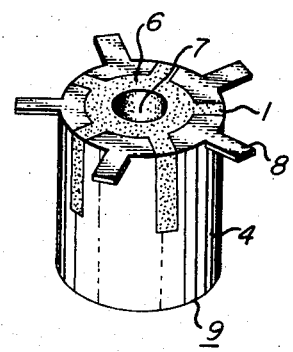

In the manner described above, a complete commutator 9 as shown in FIG. 12 is obtained. The communtator 9 is fitted on the shaft 11 of a rotary armature, with that side thereof where the wire-hooking lugs 8 are provided being located closer to the core 10 of the rotary armature, and that portion of the peripheral surface of the commutator which contacts a brush is cut. Then, slits 12 are bored axially of the commutator as an aim of the respective windows 1 up to a depth sufficient to divide the tube 4, whereby independent commutator segments 9a are formed. In FIG. 1, reference numeral 13 is an armature coil and 13a designates lead wires of the armature coil which are hooked on the respective hooking lugs 8 to effect electrical connection.

I claim:
1. A method of producing a commutator for rotary armatures having a plurality of conductive segments held in place by an insulating hub and each segment having a wire-hooking lug extending therefrom, which comprises providing a tube, with a flange on one end thereof, of electrically conductive material bulging the wall of the flanged end portion of said tube radially outwardly to form a plurality of longitudinally extending recesses, said recesses starting at the flanged end and extending along only a portion of the length of said tube and having a depth at least equal to the thickness of the wall, said recesses further outlining the tube into a plurality of segments along that portion of the tube which has been bulged, forming engaging hooks on the inside wall surface of said tube for each of the tube sections which will provide independent commutator segments, molding the said tube with an insulating material to form said insulating hub on the interior of said tube and thereafter punching the flange of the tube in such a manner as to form said wire-hooking lugs and to remove the outwardly bulged portions of the tube defining said recsses and forming a plurality of longitudinal slots in said tube, each of said slots extending from one of said recesses to the unflanged end of said tube, said slots electrically isolating said commutator segments.

References Cited

UNITED STATES PATENTS 3,482,307  12/1969  Yamaguchi ---------- 29—597

JOHN F. CAMPBELL, Primary Examiner

C. E. HALL, Assistant Examiner

U.S. Cl. X.R.

310—235, 236